Patented Oct. 28, 1947

2,429,818

UNITED STATES PATENT OFFICE 2,429,818

PYRETHRIN AND DIALKOXYALKYL PHTHALATE INSECTICIDE

Howard A. Jones, Orlando, Fla., and Raymond C. Bushland, Fort Worth, Tex., assignor to United States of America, as represented by the Secretary of Agriculture No Drawing. Original application April 28, 1944, Serial No. 533,267. Divided and this application September 19, 1944, Serial No. 554,865

5 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This is a division of our copending application for patent, Serial No. 533,267, filed April 28, 1944.

The present invention relates to insecticidal compositions, and more particularly to insecticidal compositions containing pyrethrum.

The principal object of this invention is to provide a new and improved insecticidal composition.

A further object is to enhance the effectiveness of pyrethrum by combining with it an activator or synergist.

It has long been known that pyrethrum is an effective insecticide. Pyrethrum has certain disadvantages, however, among which are its cost and the high concentrations needed to obtain complete kill of certain species of insects.

We have found that when pyrethrum is combined with dialkyl or substituted dialkyl phthalates the resulting composition has an insecticidal value far greater than would be expected as a result of additive effect of the components. The high insecticidal efficacy of the composition is especially surprising in view of the fact that the aforementioned phthalates possess very little insecticidal value in themselves. Thus, we have found that powders comprising a concentrated extract of pyrethrum flowers, a dialkyl or substituted dialkyl phthalate, and an inert carrier such as pyrophyllite are far more effective in killing body lice (*Pediculus humanus corporis*) than would be expected from the insecticidal value of any of the components alone. There is a high degree of activation of the pyrethrins by these phthalates.

We have prepared powders by dissolving a given amount of pyrethrum extract containing 20 percent pyrethrins and a given amount of dialkyl or substituted dialkyl phthalate in a mutual, volatile solvent, mixing this with the desired amount of pyrophyllite, and subsequently removing the volatile solvent by evaporation. The resulting powders were dusted on underwear-cloth sleeves, the sleeves applied to the human arm, or leg, 25 recently fed, young adult lice introduced, and the sleeves taped to the body. The lice were therefore under essentially natural conditions. Several replicates of each treatment were made. Examinations for living and dead lice were made 24 hours after treatment. In Table I and Table II are shown the insecticidal results obtained in a series of tests with powders prepared and tested as described. The results are stated in terms of percent surviving lice after 24 hours exposure to the powdered insecticidal compositions.

Table I

| Phthalate Used | 2 percent phthalate | |
| --- | --- | --- |
| | Plus 0.025% pyrethrins | Alone no pyrethrins |
| Dialkyl: | | |
| Dimethyl | 13 | 34 |
| Diethyl | 27 | 49 |
| Di-n-propyl | 1 | 17 |
| Di-iso-propyl | 0 | 8 |
| Di-n-butyl | 0 | 31 |
| Di-iso-amyl | 2 | 69 |
| Diarylalkyl: Dibenzyl | 1 | 46 |
| Dialkoxyalkyl: | | |
| Di-beta-methoxyethyl | 41 | 73 |
| Di-beta-ethoxyethyl | 21 | 51 |
| Di-beta-butoxyethyl | 16 | 60 |

Table II

| Di-n-butyl phthalate | | | |
| --- | --- | --- | --- |
| 1.0 percent phthalate | | 0.5 percent phthalate | |
| Plus 0.01% pyrethrins | Alone no pyrethrins | Plus 0.01% pyrethrins | Alone no pyrethrins |
| 10 | 51 | 9 | 67 |

In control tests of this type without any insecticidal treatment, there is an average of about 80 percent surviving or live lice after 24 hours. The concentrations of pyrethrins shown above (0.025 percent and 0.01 percent) when used alone gave the same average percent survival as the controls. Thus, this concentration of pyrethrins is completely non-toxic. It will be noted from the above tables that in general the phthalates tested were at the most only very slightly toxic, even at the high concentration of 2 percent. However, it will be seen from the table that in every case the composition comprising a non-toxic concentration of pyrethrins with a dialkyl or substituted dialkyl phthalate possessed a definitely greater insecticidal value (lower percentage of surviving or live lice) than the phthalate alone. For example, 2 percent of dibutyl phthalate alone applied as described left 31 percent live lice in 24 hours. However, by combining this with a concentration of pyrethrins which in itself has no insecticidal value, a composition was obtained that gave complete control of lice in 24 hours. Similar results have been obtained from tests on men grossly infested with lice.

The aforementioned phthalates are cited merely as examples and it is not to be inferred that other esters of phthalic acid added to pyrethrins cannot be used. Further, the above examples are not to be construed as limiting either the methods of preparation and application of this novel insecticidal composition or the kinds of insects to which it may be applied. The proportions of pyrethrum and phthalate may be varied over a wide range. The composition may be used either as a dust or as a spray with or without solvent. It may also be used in combination with other insecticides.

Having thus described our invention, we claim:

1. An insecticidal composition comprising pyrethrum and di-beta-methoxyethyl phthalate.
2. An insecticidal composition comprising pyrethrum and di-beta-ethoxyethyl phthalate.
3. An insecticidal composition comprising pyrethrum and di-beta-butoxyethyl phthalate.
4. An insecticidal composition comprising pyrethrum and a compound selected from the class of di-beta-alkoxyethyl phthalates having the general formula

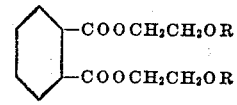

in which R is a saturated alkyl group containing from one to four carbon atoms.

5. An insecticidal composition comprising not over 0.025 percent pyrethrum and not over 2.0 percent of a compound selected from the class of di-beta-alkoxyethyl phthalates having the general formula

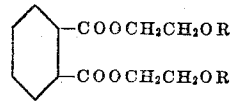

in which R is a saturated alkyl group containing from one to four carbon atoms.

HOWARD A. JONES.
RAYMOND C. BUSHLAND.